(12) United States Patent
Krueger et al.

(10) Patent No.: US 6,425,480 B1
(45) Date of Patent: *Jul. 30, 2002

(54) MOBILE-DINING MEALHOLDER WITH BOTTLE-SUPPORTED PLATE-LID

(75) Inventors: John A. Krueger, Brookfield; Ronald A. Perez, Shorewood; Peter N. Jansson, Racine, all of WI (US)

(73) Assignee: Sparks International, Inc., Brookfield, WI (US)

( * ) Notice: Subject to any disclaimer, the term of this patent is extended or adjusted under 35 U.S.C. 154(b) by 16 days.

This patent is subject to a terminal disclaimer.

(21) Appl. No.: 09/668,989

(22) Filed: Sep. 25, 2000

Related U.S. Application Data

(63) Continuation-in-part of application No. 09/441,847, filed on Nov. 17, 1999, and a continuation-in-part of application No. 09/405,759, filed on Sep. 27, 1999.

(51) Int. Cl.$^7$ ................................................ B65D 21/02
(52) U.S. Cl. ...................... 206/217; 206/541; 215/228; 220/23.86; 220/575
(58) Field of Search ................................ 206/217, 541, 206/549, 565; 220/23.83, 23.86, 574, 574.1, 575, 23.6; 215/228, 387

(56) References Cited

U.S. PATENT DOCUMENTS

| | | |
|---|---|---|
| 2,069,048 A | 1/1937 | Rehberger |
| 2,778,521 A | 1/1957 | Cagle |
| 2,827,194 A | 3/1958 | Matton |
| 4,326,639 A | 4/1982 | Stahl et al. |
| 4,561,553 A | 12/1985 | Crisci |
| 4,732,274 A | 3/1988 | Bouton |
| 4,938,373 A | 7/1990 | McKee |
| 4,946,055 A | 8/1990 | Towns et al. |
| 5,058,737 A | 10/1991 | Patterson et al. |
| 5,060,820 A | 10/1991 | Boerner |
| 5,176,283 A | 1/1993 | Patterson et al. |
| 5,190,178 A | 3/1993 | Luch |
| 5,207,743 A | 5/1993 | Costarella et al. |
| 5,213,224 A | 5/1993 | Luch |
| 5,234,125 A | 8/1993 | Roberts |
| 5,240,136 A | 8/1993 | Patterson et al. |
| 5,249,700 A | 10/1993 | Dumke |
| 5,267,661 A | 12/1993 | Luch et al. |
| 5,292,028 A | 3/1994 | Patterson et al. |
| 5,415,306 A | 5/1995 | Luch et al. |
| 5,441,164 A | 8/1995 | Beck et al. |
| 5,456,376 A | 10/1995 | Luch et al. |
| 5,593,055 A | 1/1997 | Repp et al. |
| 5,687,866 A | 11/1997 | Luch et al. |
| 5,695,052 A * | 12/1997 | Damato ...................... 206/217 |
| 5,743,423 A * | 4/1998 | Franco ...................... 220/23.86 |
| 5,755,348 A | 5/1998 | Luch et al. |
| 5,887,738 A | 3/1999 | Bietzer et al. |
| 5,913,436 A | 6/1999 | Breuer |

(List continued on next page.)

Primary Examiner—Byron P. Gehman
(74) Attorney, Agent, or Firm—Jansson, Shupe & Munger, Ltd.

(57) ABSTRACT

A mobile-dining mealholder with a plate-lid and detachable bottle, the bottle including a narrow cylindrical neck with projections at axially-spaced positions, and the plate-lid including (a) a horizontal cap portion having a downwardly-extending cylindrical skirt with projections at axially-spaced positions such that the skirt detachably engages the neck and (b) a tray portion extending outwardly from the lower edge of the skirt and having food-holding areas about the cap portion. Certain preferred embodiments involve: the tray portion having depressed regions and vertically-extending portions positioned transverse to imaginary pivot lines across the tray portion to avoid excessive flexing; the tray portion being complementary to a shoulder portion of the bottle for enhanced support; and/or either push-on or quarter-turn engagement of bottle and plate-lid.

27 Claims, 9 Drawing Sheets

U.S. PATENT DOCUMENTS

| | | |
|---|---|---|
| 5,954,195 A | 9/1999 | Krueger et al. |
| 5,960,982 A | 10/1999 | Perlis et al. |
| 5,967,352 A | 10/1999 | Repp et al. |
| 5,975,321 A | 11/1999 | Luch |
| 5,984,131 A | 11/1999 | Krueger et al. |
| 5,988,413 A | 11/1999 | Nagel |
| 6,209,737 B1 * | 4/2001 | Bliss .......................... 215/278 |

* cited by examiner

MOBILE-DINING MEALHOLDER WITH BOTTLE-SUPPORTED PLATE-LID

RELATED APPLICATIONS

This is a continuation-in-part of U.S. patent application Ser. No. 09/405,759, filed on Sep. 27, 1999 by two of the three inventors named herein, and abandoned upon this filing. This is also a continuation-in-part of Ser, No. 09/441,847 filed Nov. 17, 1999.

FIELD OF THE INVENTION

This invention is related generally to the field of disposable dishware for serving foods and beverages—and, more particularly, to the field of combined beverage containers and tray devices for portable use by persons who are consuming meals while "on the go."

BACKGROUND OF THE INVENTION

In the field of prepared-food service and dining, it is very common today for restaurants and other prepared-food outlets to serve people meals, typically made up of one or more food items together with a beverage, in or on disposable containers and/or food-holders of various types (e.g., disposable cups, plates, cartons, trays, wraps, etc.). This is typically done in what is referred to as the "fast-food" industry.

Diners involved in today's fast-paced living often are not seated at tables which provide horizontal surfaces on which to set their filled containers and/or food-holders. Instead, they are in situations in which no tabletop or the like is available and find themselves standing, driving, or engaged in activities in which it is helpful or required to have at least one hand free for some purpose.

For example, fast-food restaurants, particularly those having a "drive-through" capability, usually serve a typical customer the customer's selection of one to three solid food items (e.g., hamburgers or other sandwiches, french fries, onion rings, tacos, pieces of pie) along with a selected beverage (e.g., milkshakes, carbonated beverages, fruit juice or coffee). Sometimes the vehicle driver, particularly if he or she is alone, may find it necessary to hold both the food and the beverage with one hand, while keeping the other hand free for steering and/or other vehicle operations.

Another example is the widely-used practice at many parties and social functions of serving each guest one or more food items on a plate along with a beverage in a cup, can or bottle. If a table or other horizontal support surface is unavailable, the guest may try using the hand which is holding the beverage container to move food from the plate to his or her mouth. Or, the guest sometimes attempts to balance the beverage container on the plate in order to free one hand for eating or some other purpose, such as opening a door or shaking hands with another person. Such practices often tend to be awkward, and can frequently result in spillage and other undesirable consequences. The same sort of problem is frequently encountered at sporting events and other entertainment events where refreshments are consumed by people with no table nearby, regardless of whether the people may be standing or sitting while eating.

The prior art includes many typically-disposable dishware and/or plate-and-beverage-container combinations. However, prior devices fail to adequately solve the continuing problems faced by persons consuming meals "on the go." A number of specific disadvantages and shortcomings characterize the prior art, as will be seen by reference to various prior United States patents.

U.S. Pat. No. 5,060,820 (Boerner) discloses a plate or tray which interfaces with a centrally-located beverage container via downward extensions from the tray which are either rigid or foldable and which extend along the beverage container. A person using the Boerner device grasps the extension(s) and the container simultaneously. This combination must be gripped in order to remain engaged, and it must be separated in order to drink.

U.S. Pat. No. 5,058,737 (Patterson et al.) discloses plate-and-glass assembly which allows a person to carry a plate and a centrally-located drinking glass in one hand. The plates and glasses are engaged by what might be referred to as rail, tab or wedge system on the underside of the plate which allows a beverage container to be slidably or twistably received to centrally support the plate. The combination, must be disengaged for drinking purposes, requires customized beverage containers with mating lugs—to engage lugs on the undersides of the plates. This combination is a complex and impractical device.

U.S. Pat. Nos. 5,176,283 and 5,240,136 (both to Patterson et al.) have various disclosures, including one device which is another plate-and-glass assembly which allows a person to carry a plate and a centrally-located drinking glass in one hand, and a more pertinent device which is a plate-cap device having a flat plate overlying the top of an attached cap which can be screwed onto the top of a jar-like receptacle. These devices, including the latter, have complex straw arrangements, and are impractical and uneconomical, difficult to detachably engage and otherwise difficult to use, and problematic insofar as the understanding of users is concerned, whether the users are persons serving or persons dining.

U.S. Pat. No. 5,292,028 (Patterson et al.) discloses a number of complex plate-and-glass assemblies which allow a person to carry a plate and a centrally-located drinking glass in one hand. The plates and glasses are engaged by what might be referred to as rail, tab or wedge systems on the undersides of the plates, which systems allow beverage containers (e.g., beverage cans) to be slidably or twistably received to centrally support the plate. The devices of this patent include drinking straw ports. These devices are complex multi-part devices which are impractical to manufacture and use.

U.S. Pat. No. 4,938,373 (McKee) discloses a plate which interfaces with a beverage container utilizing a press-fit V-type friction-engagement groove. The plate has a centrally-located upwardly-extending annulus which forms (1) the V-groove on the underside of the plate for frictional engagement with the container lip and (2) a female receptacle on the top of the plate within which to place the bottom of the cup (on top of the plate) or an ashtray. The plate has a central hole to receive a straw. When the container is engaged beneath the plate, the lack of a positive engagement may be problematic, particularly when substantial non-distributed loads are placed on edge portions of the plate. As with certain other prior art, the plate has no means for reinforcement to resist excessive flexing under non-distributed loads.

U.S. Pat. Nos. 5,207,743 (Costarella), 5,234,125 (Roberts) and U.S. Pat. No. 5,441,164 (Beck) disclose further combinations in which beverage containers fit within plates via holes through, or raised receptacles in, plates.

Mobile-dining mealholders used in various situations are susceptible to substantial downward loading forces, both from the weight of foodstuffs thereon and from movements which occur during dining. There is a need for an improved mobile-dining mealholder which is of a light weight favoring disposability but which (1) still functions to provide support against such downward loading forces, (2) has excellent detachable engagement to avoid risks of beverage spilling, and (3) instills excellent user confidence with its support and containment functions during usage, even though held by only one hand.

There is a particular need for a mobile-dining mealholder including a beverage container in the form of a bottle, and which is an easily-joined combination that can be economically manufactured, firmly engageable together, practical to use, and easily understood by users.

The following objects of the invention are indicative of various problems and shortcomings in the prior art.

OBJECTS OF THE INVENTION

It is an object of this invention to provide an improved mobile-dining mealholder and mealholder plate-lid overcoming problems and shortcomings of the prior art.

Another object of this invention is to provide an improved mobile-dining mealholder combination including a ordinary beverage bottle.

Another object of this invention is to provide an improved mobile-dining mealholder having a detachably-secured plate-lid and beverage container which are held in firm engagement together so that, even when the sole support for the mealholder is by the user's grasp of the beverage container, solid foodstuffs may be reliably and confidently supported on the plate-lid as dining proceeds.

Another object of the invention is to provide an improved mobile-dining mealholder having a detachably-secured plate-lid and beverage container which are held in reliable engagement so that beverage leakage and spilling are prevented even during inattentive use by a person consuming a meal held by the mealholder.

Another object of the invention is to provide an improved mobile-dining mealholder plate-lid which is of one-piece construction and is easily manufactured, readily engageable with an ordinary beverage bottle, yet provides the above-mentioned advantages in detachable engagement with a beverage bottle.

Another object of the invention is to provide an improved mobile-dining mealholder plate-lid which is readily engageable with ordinary beverage bottles by push-on engagement, regardless of the form of threading on the neck of the beverage bottle.

Another object of the invention is to provide an improved mobile-dining mealholder plate-lid which, although made of an inexpensive thermoformed plastic piece, resists excessive flexing despite substantial vertical loads thereon from foodstuffs and from dining movements.

Still another object of the invention is to provide an improved mobile-dining mealholder having a plate-lid with a cap portion particularly suited to resist unintended disengagement of a bottle with which it is engaged.

Another object of the invention is to provide an improved mobile-dining mealholder having a plate-lid with a cap portion which is easily and reliably detachably secured to a bottle.

Another object of the invention is to provide an improved mobile-dining mealholder with the above-noted advantages and which is formed to accommodate foodstuffs and servings of characteristic shapes and sizes for easy serving presentation and for convenient control during mobile dining.

Still another object of the invention is to provide an improved mobile-dining mealholder with the above-noted advantages and which further serves to shield and maintain the heat of hot food served thereon.

Yet another object of this invention is to provide an improved mobile-dining mealholder allowing convenient control of solid footstuffs and simultaneous easy consumption of a beverage with minimal manual involvement.

These and other objects of the invention will be apparent from the following descriptions and from the drawings.

SUMMARY OF THE INVENTION

This invention is an improved mobile-dining mealholder which overcomes a number of significant disadvantages, shortcomings and problems of mealholders of the prior art, and is a highly convenient tool usable, for example, by the fast-food industry and by people who are dining "on the go." The inventive mealholder has two principal parts—a beverage bottle and a plate-lid—which are detachably combined. The invention also involves the plate-lid for use in such combination.

More specifically, the invention is an improved mobile-dining mealholder of the type having a beverage container and a plate-lid detachably combined. The beverage container is a bottle with a substantially cylindrical neck terminating upwardly in a lip, the neck having an outer surface with first engagement means projecting therefrom at axially-spaced positions. The plate-lid, detachably secured to the neck of the bottle, includes two principal portions which are preferably integrally formed—a horizontal cap portion and a tray portion extending therefrom. The cap portion overlies the lip of the bottle neck and has a downwardly-extending substantially cylindrical skirt terminating in a lower edge. The skirt has an inner surface with second engagement means projecting therefrom at axially-spaced positions, thereby to facilitate detachable engagement of the cap portion with the neck of the bottle. The tray portion extends outwardly from the lower edge of the cap portion and has horizontally-arranged food-holding areas arranged about the cap portion.

The plate-lid, with all its characteristics, including those hereafter described, is preferably made by thermoforming of suitable plastic sheets. The thermoformed platelid units are preferably nestable before their use.

In certain highly preferred embodiments, the tray portion of the plate-lid includes at least one food-receiving depressed region formed therein, and preferably two or more food-receiving depressed regions spaced about the cap portion. Some or all of such depressed regions have specified depths and even shapes based upon a selected foodstuffs intended to be served therein. In some preferred cases, a depressed food-receiving region has an opening therethrough to provide flexibility for positioning a particular foodstuff item the shape of which is more readily accommodated by the opening than by the depressed region without such opening.

The tray portion of the mobile-dining mealholder of this invention preferably includes, by virtue of the plurality of depressed regions, vertically-extending portions which are positioned and arranged such that, for each of a plurality of imaginary horizontal pivot lines across the tray portion and adjacent to the cap portion, at least one of the vertically-extending portions is transverse to the pivot line. This provides helpful reinforcement against flexing of the plate-lid about such pivot line.

In certain highly preferred embodiments, the tray portion has an outer edge and a vertically-extending edge portion formed therealong. This provides reinforcement against flexing of the tray portion under loads imposed by food on the tray portion. Some preferred embodiments of this type also include a removable tray cover having a cover edge portion which is configured for placement on the tray portion along the vertically-extending outer edge thereof. This positions the tray cover with respect to the tray portion, and helps hold in heat.

In some of the embodiments having a vertically-extending edge portion, the outer edge includes a near edge and a far edge and the cap portion is adjacent to the near edge. In such embodiments it is preferred that the near edge be substantially straight, since this enables the diner to hold the beverage and food nearby to facilitate drinking and eating.

The cap portion of the plate-lid has a straw-receiving opening therethrough for the purpose of gaining access to the beverage.

In certain highly preferred embodiments, the bottle has a shoulder portion extending outwardly from the neck, and the tray portion of the plate-lid includes a shoulder-engagement portion which extends outwardly from the cap portion and is substantially complementary in shape to the shoulder portion. This serves to provide enhanced support for the tray portion; the plate-lid, while engaged primarily with the neck portion of the bottle, is also supported or supportable by upper surfaces of the bottle which underlie larger central portions of the plate-lid. In preferred examples of such arrangements, the shoulder portion of the bottle and the shoulder-engagement portion of the plate-lid both extend outwardly in a downward direction.

The first and second projecting engagement means, on the bottle neck and on the skirt of the cap portion of the plate-lid, may be simple spiral projections which require substantial rotational motion for screwing the plate-lid onto the neck of the bottle, and for later detachment by unscrewing. However, in certain highly preferred embodiments, the first and second engagement means, each of which projects (from the neck and from the skirt, respectively) at axially-spaced positions, are together configured and arranged such that engagement of the cap portion of the plate-lid with the neck of the bottle is of the snap-on/screw-off type. This facilitates engagement of the bottle with the plate-lid including after food is served thereon; in a fast-food service environment, the unique combination of this preferred embodiment indeed makes assembly of such mobile-dining mealholder a very practical procedure.

As indicated above, the first engagement means, on the outer surface of the neck of the bottle, is not a unitary or discontinuous bead around the neck at one axial position; instead, it is one or more projections which is (are) on and around the neck at plural, axially-spaced positions. One example is a single spiral thread which projects from the neck along an axial range of positions along the neck. Another example is an overlapping staggered array of spiral threads, often of small thread height (i.e., the radial extent of projection from the neck), one configuration and arrangement which is particularly useful when the highly preferred snap-on/screw-off engagement is desired.

The second engagement means, on the inner surface of the skirt of the cap portion of the plate-lid, is likewise not at one axial position along the skirt; instead, it is one or more projections which is (are) on and around the skirt at plural, axially-spaced positions. When the first engagement means (on the neck of the bottle) is of the preferred form described in the preceding paragraph (involving an overlapping staggered array of short spiral threads), the second engagement means may also be an overlapping staggered array of spiral threads, again of small thread height (in this case, measured radially inwardly from the skirt inner surface). Such projection arrays are together configured and arranged to provide snap-on/screw-off engagement.

A wide variety of other snap-on/screw-off or other push-on configurations are possible. In one highly preferred form, the second engagement means, which projects from the inner surface of the skirt of the cap portion of the plate-lid at axially-spaced positions, can be an array of flexible, resilient projections configured and arranged to pass over and engage substantially rigid neck threading of various configurations. Such an array serves to provide good attachment and reliable push-on engagement with a wide variety of first engagement means, including the ordinary rigid spiral threads on the necks of many bottles. This allows easy and reliable detachable engagement of the plate-lid with a variety of different standard neck threading configurations used on many different bottled soft drinks, beers and other beverages, and facilitates push-on engagement of the plate-lid with the bottle in a fast-food service environment.

Another preferred embodiment when it comes to mobile-dining mealholders of the type broadly described above involves the first and second engagement means being configured and arranged such that engagement of the cap portion of the plate-lid with the neck of the bottle is of the quarter-turn type. This, too, facilitates engagement of the bottle with the plate-lid in a fast-food environment, including after food is served thereon.

The inventive mobile-dining mealholder described herein also involves the improvement wherein: (1) the beverage container is a bottle having a main portion and a substantially narrower cylindrical neck which terminates upwardly in a lip, the neck having first engagement means projecting therefrom at axially-spaced positions; and (2) the plate-lid includes (a) a substantially horizontal cap portion overlying the lip and terminating in a downward substantially cylindrical skirt which is detachably engaged with the neck, the skirt having second engagement means projecting therefrom at axially-spaced positions, and (b) a tray portion extending outwardly from the cap portion and having horizontally-arranged food-holding areas spaced about the cap portion.

In preferred embodiments of such device, the skirt has a lower edge and the tray portion extends outwardly from the lower edge. In one highly preferred embodiment, the bottle has a shoulder portion extending outwardly from the neck and the tray portion of the plate-lid includes a shoulder-engagement portion which extends outwardly from the cap portion, most preferably in a downward direction, and is substantially complementary in shape to the shoulder portion. This, as noted above, provides enhanced plate-lid support.

This invention is also a mealholder plate-lid as described above for detachable engagement with a bottle having a cylindrical neck which terminates upwardly in a lip and has an outer surface with first engagement means projecting therefrom at axially-spaced positions. As already stated, the plate-lid includes (a) a substantially horizontal cap portion for overlying the lip and having a downwardly-extending substantially cylindrical skirt which terminates in a lower edge and has an inner surface with second engagement means projecting therefrom at axially-space positions for attachment of the skirt to the neck, and (b) a tray portion extending outwardly from the cap portion and having horizontally-arranged food-holding areas about the cap portion, the tray and cap portions together forming a single integral piece. As noted above, the second engagement means which projects from the inner surface of the skirt is preferably configured and arranged for to facilitate engagement with the bottle, most preferably by push-on engagement.

This invention provides a significant change and dramatic improvement in the manner in which "fast-food" meals are presented to people "on the go," including, for example, people who purchase "fast-food" meals using drive-through facilities and persons who buy "meals" at sporting events and the like. The invention provides an easy and convenient way to dine in those situations in which a tabletop (to support plates and other dishes) is unavailable.

The two principal parts of the mobile-dining mealholder of this invention are firmly engaged to one another so that, even though support of the mealholder is solely by the user's grasp of the bottle, foodstuffs are reliably and confidently supported on the plate-lid during dining. The invention provides a reliable engagement of bottle and plate-lid, and this also serves to resist spilling even though the user may be inattentive while consuming a meal.

The plate-lid of this invention, even when made of a thin thermoformed plastic piece, as is preferred, serves to resist excessive flexing despite substantial vertical loads thereon from foodstuffs and from dining movements. Such flexing resistance is provided in various ways. The plurality of food-receiving depressed regions in the plate-lids of preferred embodiments are not only formed to accommodate a variety of specific solid foods and types of foods, but they are configured and arranged to provide reinforcement against the excessive flexing (or collapse) which would otherwise be caused by heavy foods and/or by typical movements during eating.

Specific forms of such plate-lids may readily accommodate a burger, French fries and condiments (ketchup) or a variety of alternatives; other forms are designed to accommodate, e.g., nachos and cheese. Virtually endless varieties are possible to provide mobile-dining mealholders which readily accommodate the needs of nearly any prepared food retailer and its customers.

As used herein, the term "mobile-dining," in describing a mealholder, refers to the ability to be carried easily in one hand by a person who is eating a meal without sitting down at a table. Of course, the mobile-dining mealholder of this invention may be used in other ways as well.

The use of directional terms like "lower," "horizontal," "horizontally-arranged" and "vertically-extending" refer to the mobile-dining mealholder or its principal parts in their normal usage orientations—i.e., with the beverage container in an upright position. The term "vertically-extending," used in describing portions of the tray portion of the plate-lid, refers to the fact that there is a change in the vertical position; the term does not require that the portion in question itself be oriented at 90° to a horizontal plane. The term "outwardly" as used in referring to the relationship of the tray portion of the plate-lid to the cap portion of the plate-lid refers to an extension from the cap portion in a generally horizontal direction.

The term "integral" used in describing the relationship of one portion of the plate-lid to another means that the portions are not just joined to one another, but are formed together, such as in a thermoforming or other plastic fabrication process.

The term "imaginary horizontal pivot lines" refers to a mathematical line; it is imaginary only in the sense that it does not involve any visible indication. The term "transverse," of course, means across or at an angle to something, but not necessarily at an angle of 90°.

The terms "near edge" and "far edge," used in reference to portions of the outer edge of the plate-lid, refer to the edges which are, respectively, closest to and farthest from the body of the user during dining.

The term "engagement means," used in referring to projection(s) from the outer surface of the neck of a bottle or from the inner surface of the skirt of the cap portion of the plate-lid, does not mandate any particular form or arrangement of projection(s), or any degree of continuity or discontinuity of projecting structures.

The term "push-on," used in describing the motion sufficient for attachment of a plate-lid to a bottle, refers to an axial motion not requiring any rotation. The same thing is intended when the term "snap-on" is used with respect to the attachment motion. The terms "snap-on" and "push-on" have essentially the same meaning; the former term is used at some points of this disclosure because of its usage in the art in reference to caps.

The term "shoulder" does not imply any specific shape; that is, it does not imply a profile which includes surfaces at 90° to the axis (of the bottle or plate-lid). Instead, it refers to outwardly extending structures which are broader than the neck of the bottle or the cap portion of the plate-lid.

DETAILED DESCRIPTIONS OF PREFERRED EMBODIMENTS

Figure 1:
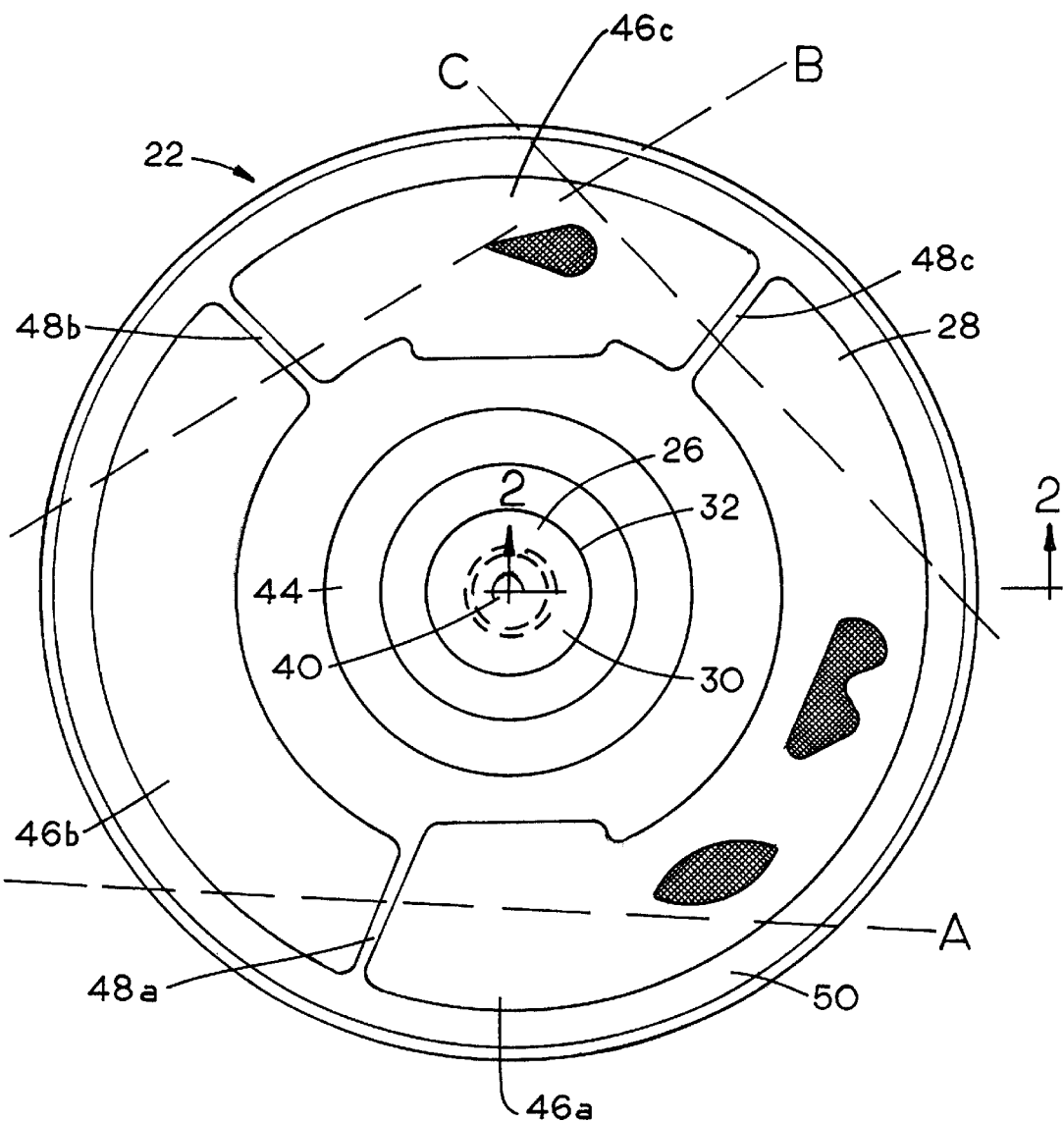
FIG. 1 is a plan view of the plate-lid of a mobile-dining mealholder in accordance with this invention.
Figure 2:
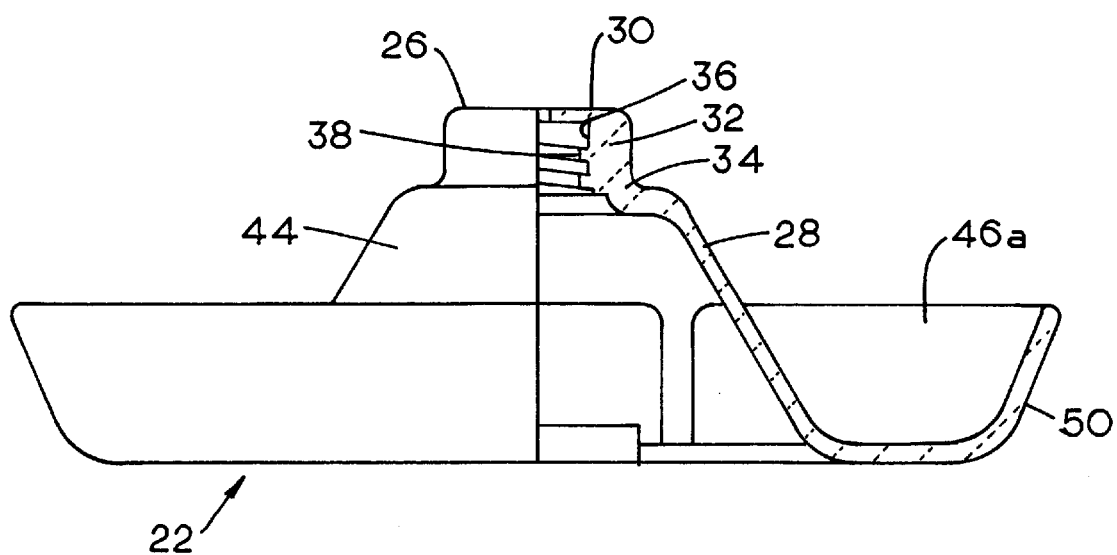
FIG. 2 is a partially-sectional side elevation of FIG. 1, the sectional portion being that indicated by section 2—2 in FIG. 1.
Figure 3:
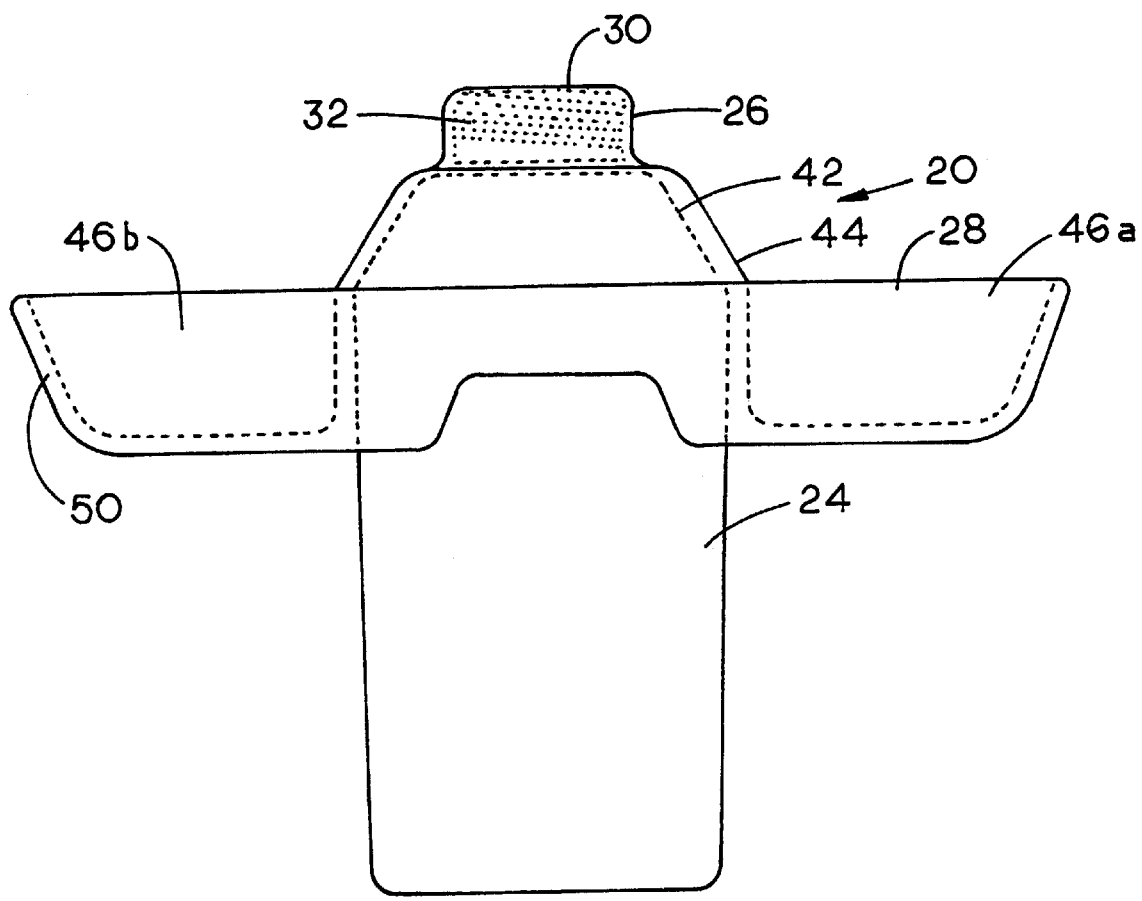
FIG. 3 is a side elevation of a mobile-dining mealholder formed by the plate-lid of FIGS. 1 and 2 and a beverage bottle to which it is attached.

FIGS. 1–3 illustrate a plastic plate-lid 22 which is designed for multiple uses and is formed for detachable engagement with the external threads of the neck of a bottle 24 to form a mobile-dining mealholder 20. Bottle 24 is a typical beverage container, such as may be used in fast-food establishments and by concessionaires at sporting events, entertainment events, fairs and the like, where it is advantageous to combine a plate or tray with a beverage container.

Plate-lid 22, which is detachably secured to the neck of bottle 24, includes a horizontal cap portion 26 and a tray portion 28 extending therefrom. Cap portion 26 has a top wall 30 overlies the lip of the neck of bottle 24 and a downwardly-extending cylindrical skirt 32 which terminates in a lower edge 34. Skirt 32 has an inner surface 36 from which internal threads 38 project. Threads 38 are in mating relationship the external threads projecting from the neck (not shown) of bottle 24, such that plate-lid 22 can be firmly attached to bottle 24.

Tray portion of 28 of plate-lid 22 is integrally-formed with cap portion 26 and extends from lower edge 34 of cap portion 26. Thus, cap portion 26 projects upwardly from tray portion 28 and presents top wall as a visible support point for tray portion 28 and whatever it may be carrying. Top wall 30 has an access hole 40 through it to provide access to the beverage within bottle 24 by a straw.

Bottle 24 has a shoulder portion 42 which extends radially outwardly from the neck of the bottle, and tray portion 28 of plate-lid 22 includes a shoulder-engagement portion 44 which extends radially outwardly from cap portion 26 and is complementary in shape to shoulder portion 42. By this complementary configuration, bottle 24 provides enhanced support for plate-lid 22. Both shoulder portion 42 and shoulder-engagement portion 44 extend radially outwardly in a downward direction.

Tray portion 28 has horizontally-arranged food-receiving depressed regions 46a–c arranged about cap portion 26. Between adjacent pairs of depressed regions 46a–c, tray portion 28 has vertically-extending portions 48a–c, which are positioned and arranged such that, for each of a plurality of imaginary horizontal pivot lines across the tray portion and adjacent to the cap portion, such as lines A, B and C, at least one of the vertically-extending portions is transverse to such pivot line. This provides the plate-lid reinforcement referred to above.

Tray portion 28 also includes a vertically-extending edge portion 50 formed therealong, which provides additional reinforcement against flexing as noted above.

Figure 4:
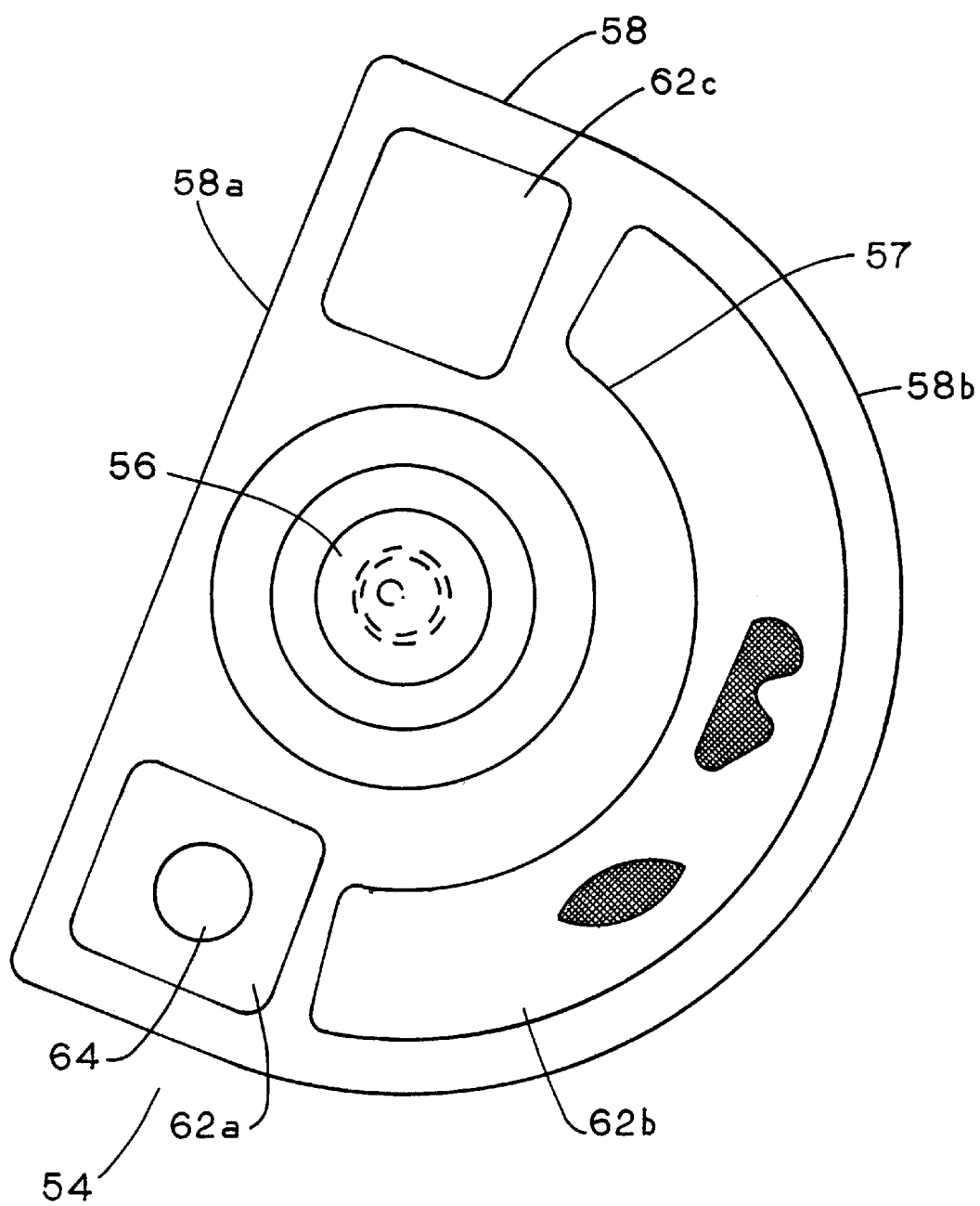
FIG. 4 is a plan view of another plate-lid in accordance with this invention.
Figure 5:
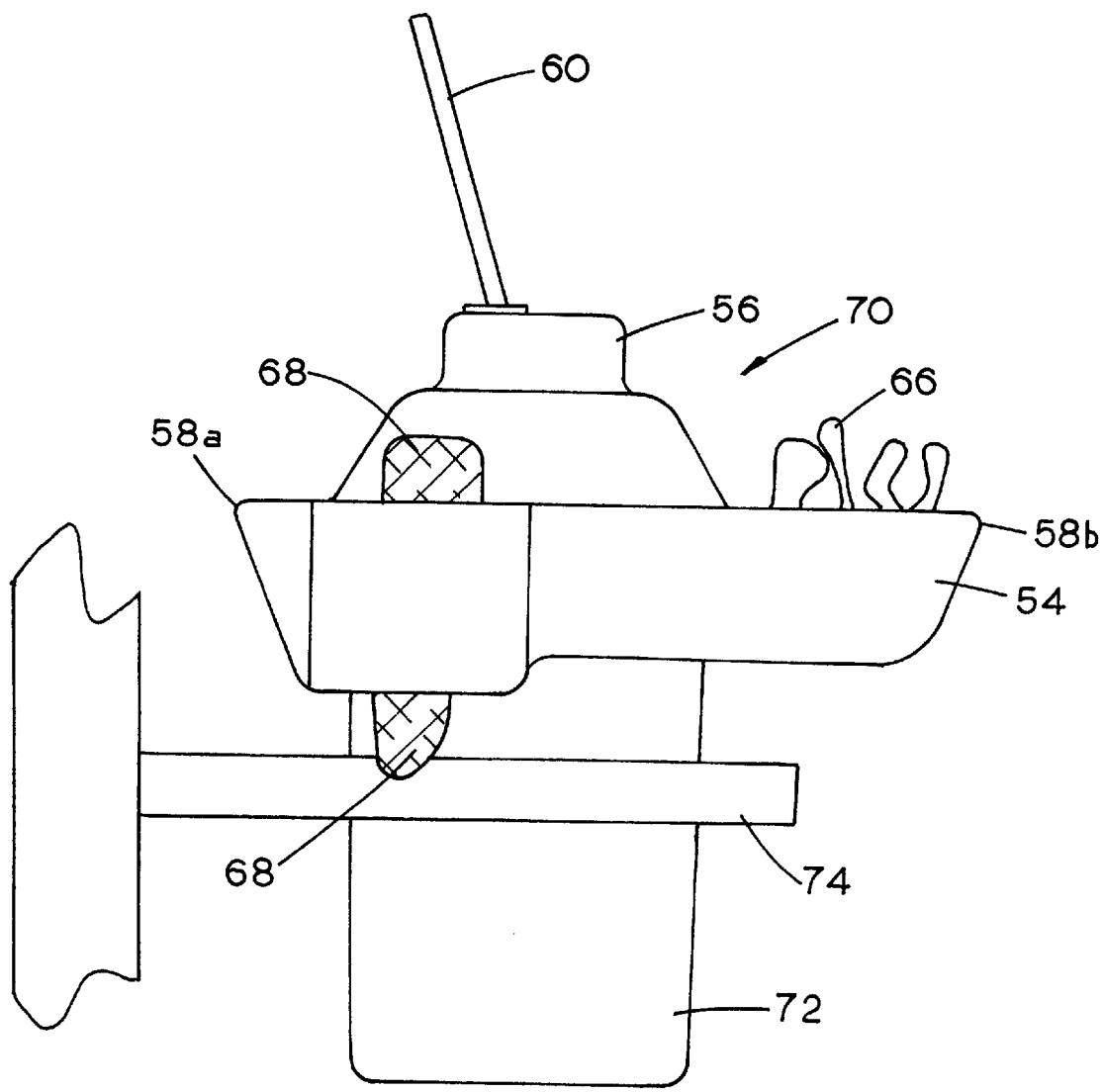
FIG. 5 is a side elevation of a mobile dining mealholder formed by the plate-lid of FIG. 4 and the beverage bottle to which it is attached, such mealholder being held by support of the bottle in a cupholder of an automobile.

While the shape of plate-lid 22 of the embodiment of FIGS. 1–3 is circular, with cap portion 26 in the center of plate-lid 22, the embodiment of FIGS. 4 and 5 has a plate-lid 54 with a cap portion 56 which is off-center. As can be seen, the embodiment of FIGS. 4 and 5 has many characteristics in common with that of FIGS. 1–3. However, plate-lid 54 has a tray portion 57 with an outer edge (a vertically-extending edge portion) 58 which includes a near edge 58a and a far edge 58b. Near edge 58a is "near" in that it is the edge close to the body of the diner, and far edge 58b is "far" in that it is away from the body of the diner. Near edge 58a is straight, and cap portion 56 is adjacent to near edge 58a. As noted above, this allows a diner to hold the bottle close so that drinking from a straw 60 (see FIG. 5) is facilitated.

Tray portion 57 of plate-lid 54 of FIGS. 4 and 5 has food-receiving depressed regions 62a–c (food-holding areas) spaced about cap portion 56. Depressed regions 62a–c have specified depths based upon selected foodstuffs intended to be placed therein, such as the French fries 66 in depressed region 62b, as illustrated in FIG. 5. Depressed region 62a has an opening 64 through it to facilitate placement of a particular food item 68 which is of size and shape such that it needs to protrude through opening 64 to be well accommodated in depressed region 62a.

FIG. 5 also illustrates how the mobile-dining mealholder 70 of FIG. 5, which includes plate-lid 54 in combination with a bottle 72, can be supported in a cup holder 74 such as may be found in vehicles. More specifically, bottle 72 is supported in cupholder 74 and plate-lid 54 is supported by bottle 72.

Figure 6:
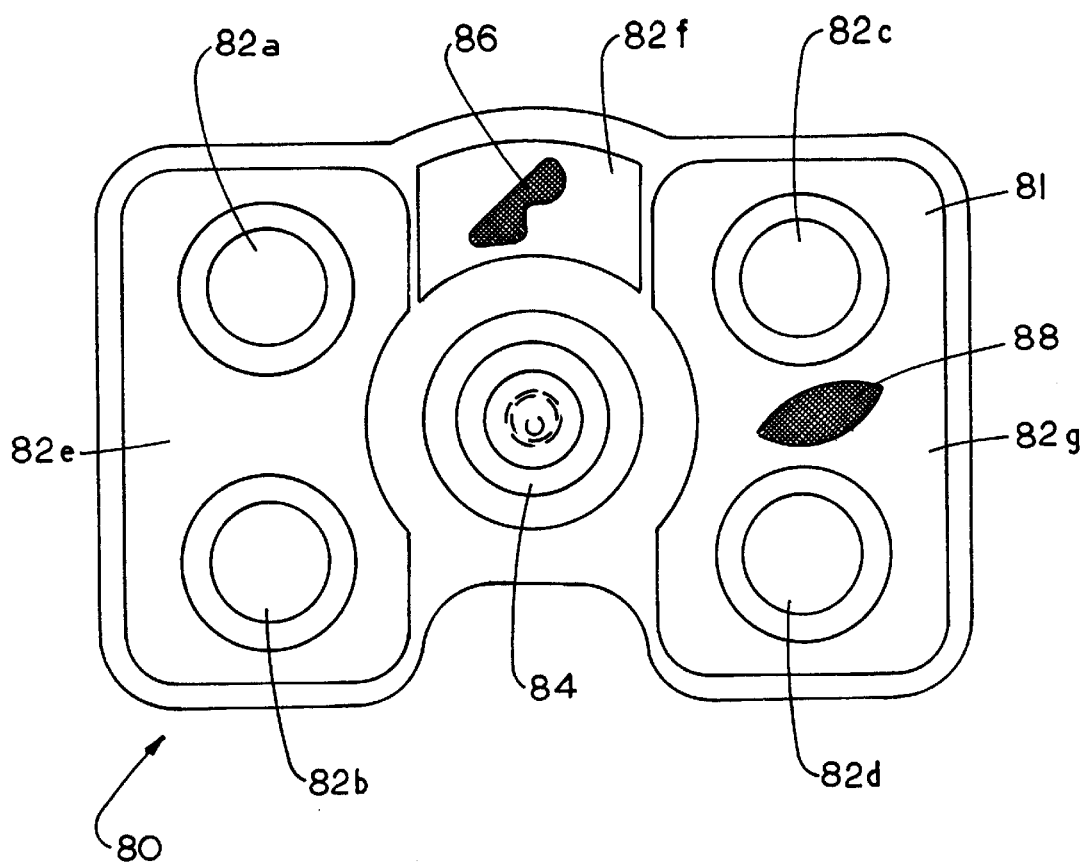
FIG. 6 is a plan view of still another plate-lid in accordance with this invention.
Figure 7:
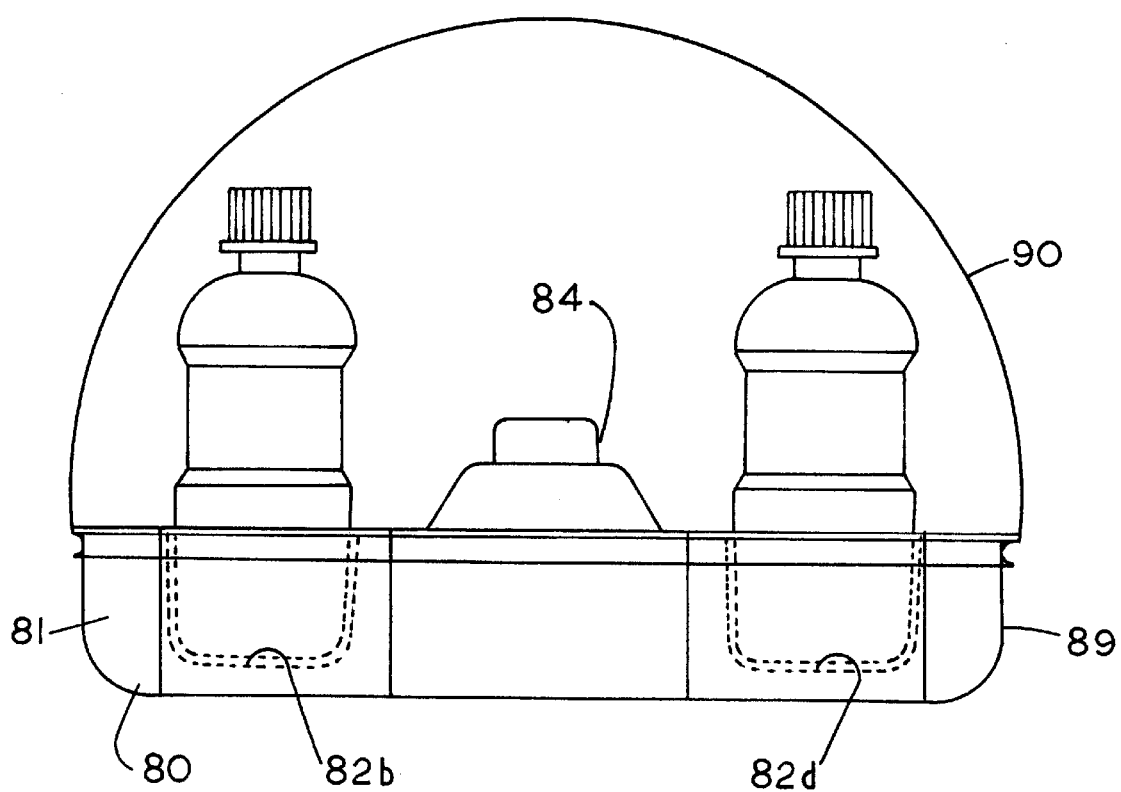
FIG. 7 is a side elevation of the plate-lid of FIG. 6 being used to carry multiple beverage containers, and having a dome over it, illustrated schematically.

Still another embodiment of this invention is illustrated by FIGS. 6 and 7. As can be seen, the embodiment of FIGS. 6 and 7 has many of the characteristics of the embodiments of FIGS. 1–5, but has a plate-lid 80 different in shape than either plate-lid 22 or plate-lid 54. Plate-lid 80 includes a tray portion 81 which has food-receiving depressed regions 82a–g. Deep depressed regions 82a–d are designed to receive four bottles beyond the principal bottle (not shown) which is for detachable engagement with the cap portion 84 of plate-lid 80. Thus, in addition to carrying solid foodstuffs, such as foodstuff 86 in food-receiving region 82f and foodstuff 88 in food-receiving region 82g, plate-lid 80 can serve as a caddy to carry bottled beverages (or beverages in cups) for persons other than the person who will drink (via a straw, not shown) from the principal bottle (not shown).

As illustrated in FIG. 7, tray portion 81 of plate-lid 80 includes a vertically-extending outer edge portion 89, providing reinforcement against flexing, as is also seen with respect to plate-lids 22 and 54 referred to above. Tray portion 81 of plate-lid 80 also has a removable tray cover 90 which has an edge portion configured for placement on tray portion 81 along vertically-extending outer edge 89, thereby to position tray cover 90.

Figure 8:
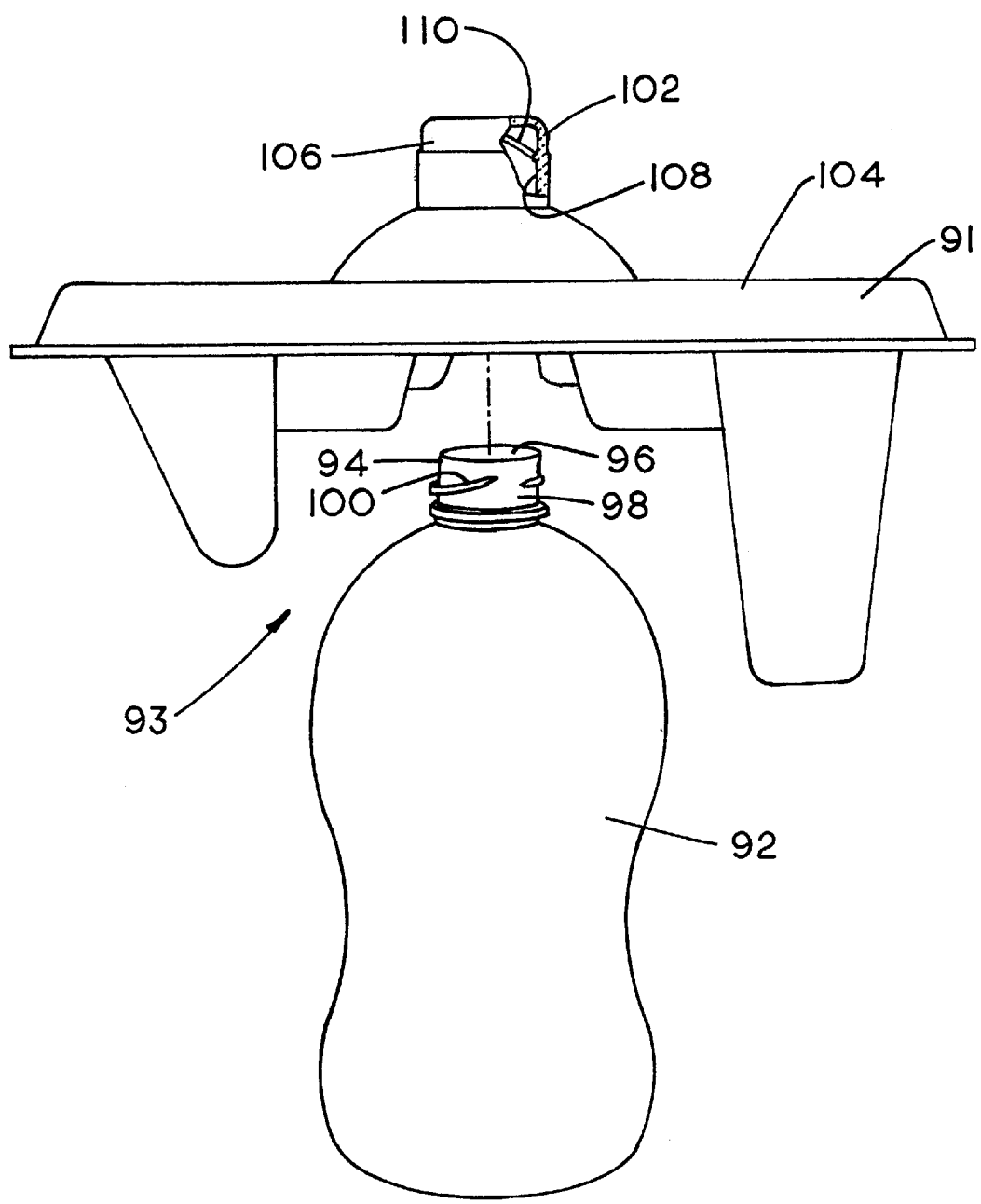
FIG. 8 is an exploded, partially sectional, side elevation of another food-laden mobile-dining mealholder in accordance with this invention.
Figure 9:
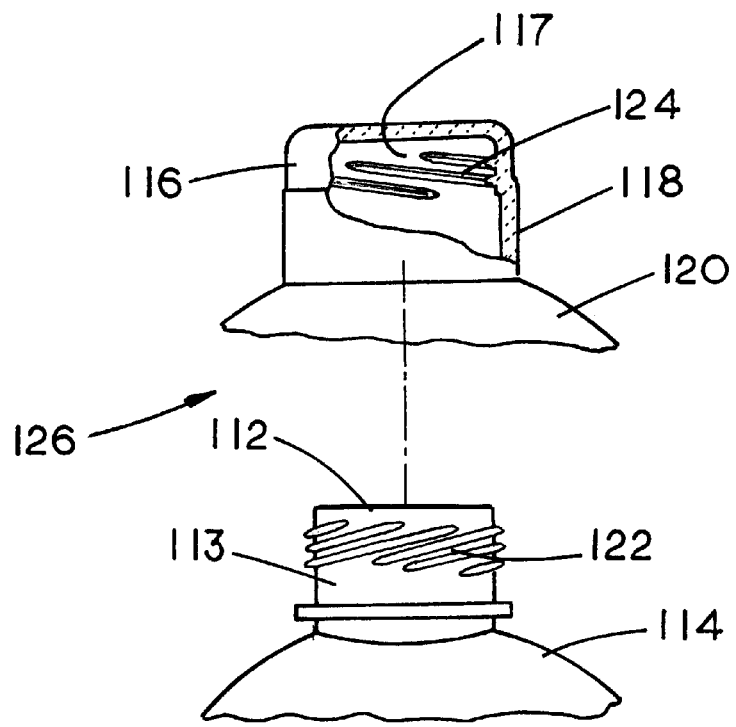
FIG. 9 is a fragmentary, exploded, partially sectional side elevation of portions of the plate-lid and bottle of another mobile-dining mealholder in accordance with this invention.
Figure 10:
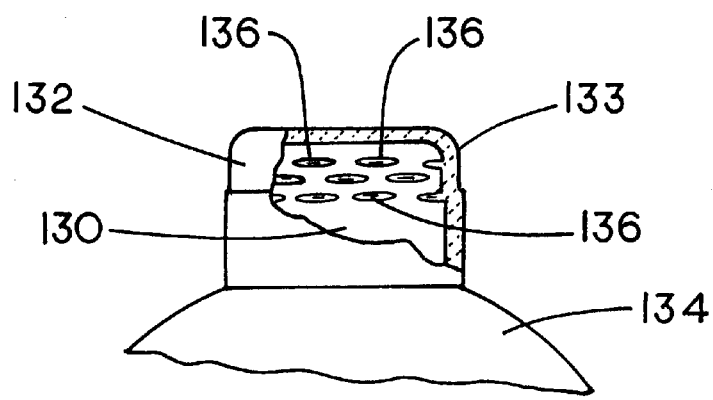
FIG. 10 is a fragmentary, partially sectional side elevation of portions of another plate-lid in accordance with this invention.

FIGS. 8–10 illustrate preferred forms of the first and second engagement means referred to above. FIGS. 8 and 9 illustrate the necks of bottles used in combination with plate-lids to form mobile-dining mealholders in accordance with this invention.

FIG. 8 illustrates a plate-lid 91 and a bottle 92 which together form a mobile-dining mealholder 93. Bottle 92 has a cylindrical neck 94 which terminates in a circular lip 96 and has an outer surface 98. Outer surface 98 has first engagement means thereon in the form of threading 100 which projects radially outwardly therefrom at axially-spaced positions. Plate-lid 91 has a cap portion 102 and a tray portion 104, and cap portion 102 has a cylindrical skirt 106 (sized to receive neck 94) with an inner surface 108. Inner surface 108 has second engagement means thereon in the form of threading 110, which projects radially inwardly therefrom at axially-spaced positions. Threading 100 and threading 110 are configured and arranged such that cap portion 102 and neck 94 are detachably engageable by approximately a quarter turn. As noted above, this facilitates engagement of bottle 92 with plate-lid 91 in a fast-food environment, including after food is served on plate-lid 91.

FIG. 9 illustrates a highly preferred embodiment with a different form of threading and engagement. Neck 112 of bottle 114 and skirt 116 of cap portion 118 of plate-lid 120 have overlapping staggered arrays of spiral threads of small thread height (i.e., projection from the outer surface 113 of neck 112 or projection from the inner surface 117 of outer surface 113). In particular, neck 112 of bottle 114 has an array 122 of such spiral threads, and skirt 116 of cap portion 118 of plate-lid 120 has another array 124 of such spiral threads. In this way, the engagement means are configured and arranged such that cap portion 118 of plate-lid 120 can be engaged with neck 112 of bottle 114 by a push-on (i.e., snap-on) motion—a motion requiring no rotation. As already noted, this facilitates engagement of bottle 114 with plate-lid 120 to form an easily assembled mobile-dining mealholder 126.

A wide variety of threading or other engagement means projecting at axially-spaced positions are known in the bottlecap art and are often referred to as "snap-on/ screw-off" configurations and arrangements. Some of the many known examples are referred to in U.S. Pat. Nos. 4,561,553, 4,946,055, 5,190,178, 5,213,224, 5,267,661, 5,415,306, 5,456,376, 5,593,055, 5,687,866, 5,755,348, 5,887,738, 5,975,321 and 5,9967,352. Snap-on/screw-off configurations and arrangements can provide tight, reliable engagement that serves the purposes of this invention.

Another highly preferred push-on configuration and arrangement is illustrated in FIG. 10. In such variation, the engagement means projecting from the inner surface 130 of the skirt 132 of the cap portion 133 of plate-lid 134 is an array of flexible, resilient projections 136 which are configured and arranged to pass over and engage essentially any sort of projections on a bottle neck (not shown), including substantially rigid neck threading of various configurations. Projections 136 of the array are preferably integrally formed with plate-lid 134 and are dimensioned to snap individually over projections they encounter on the neck of a bottle until the neck of the bottle is fully seated within skirt 132.

Mobile-dining mealholders in accordance with this invention can be designed to accommodate particular popular fast foods—e.g., hamburgers, French fries, ketchup or other condiments, tacos, nachos and cheese, sandwiches, cookies, candy, etc. The plate-lids of this invention can be thermoformed, and such thermoformed shapes can be made to serve the particular marketing/serving purposes of the fast-food and catering establishments for which they are made.

The plate-lids of this invention, when thermoformed, are made from flat sheets of plastic under appropriate temperatures and pressures, in known manner. Among the acceptable materials are acrylonitrile-butadiene-styrene copolymer (ABS), high-impact polystyrene (HIPS), high-density polyethylene (HDPE), high-molecular-weight polyethylene (HMWPE), polypropylene (PP), polyvinyl chloride (PVC), polymethyl methacrylate (or "acrylic") (PMMA) and polyethylene terephthalate modified with CHDM (PETG). Thermoforming of the plate-lids allows close tolerances, relatively thin final average thicknesses, sharp detailing, formed-in texture, formed-in logos and custom colors. The average thickness of a plate-lid is about 0.020 inch, although other thickness can be chosen. Average thickness is preferably within the range of about 0.010–0.030 inch, and most preferably within the range of about 0.015–0.025 inch. Despite the thinness of the plate-lids, their tray portions can function well without excessive flexing due to the reinforcement features described above. Specific dimensions and design will depend on the specific intended usage.

The preferred thermoforming is best facilitated by appropriate design of the plate-lid, taking into account the depths of necessary draws, the angles of the aforementioned vertically-extending surfaces (which are preferably tapered for ease of thermoforming), and other factors. It is also helpful to design the plate-lid in a manner preventing excessive nesting in a stack of identical plate-lids. Anti-nesting features and characteristics can include the tapers which are utilized in the particular designs. Suitable features and characteristics to avoid excessive nesting are known in the thermoforming art.

While the plate-lids of the mobile-dining mealholders of this invention are preferably formed by well-known thermoforming methods, other known fabrication methods, such as injection molding, can be used instead.

While the principles of this invention have been described in connection with specific embodiments, it should be understood clearly that these descriptions are made only by way of example and are not intended to limit the scope of the invention.

What is claimed is:

1. In a mobile-dining mealholder having a beverage container and a plate-lid detachably combined, the improvement wherein:

the beverage container is a bottle with a substantially cylindrical neck which terminates upwardly in a lip, the neck having an outer surface with first engagement means projecting therefrom at axially-spaced positions;

the plate-lid includes (a) a substantially horizontal cap portion overlying the lip and having a straw-receiving opening therethrough to gain access to the beverage and a downwardly-extending substantially cylindrical skirt which terminates in a lower edge and detachably engages the neck, the skirt having an inner surface with second engagement means projecting therefrom at axially-spaced positions and engaging the first engagement means, and (b) a tray portion extending outwardly from the lower edge of the cap portion and having horizontally-arranged food-receiving areas about the cap portion, the tray and cap portions forming a single integral piece.

2. The mobile-dining mealholder of claim 1 wherein the tray portion includes at least one food-receiving depressed region formed therein.

3. The mobile-dining mealholder of claim 2 wherein at least one of the at least one depressed regions has an opening therethrough to provide flexibility for positioning foodstuffs.

4. The mobile-dining mealholder of claim 2 including a plurality of the food-receiving depressed regions spaced about the cap portion.

5. The mobile-dining mealholder of claim 4 wherein the tray portion, by virtue of the plurality of depressed regions, has vertically-extending portions positioned and arranged such that, for each of a plurality of imaginary horizontal pivot lines across the tray portion and adjacent to the cap portion, at least one of the vertically-extending portions is transverse to the pivot line, thereby providing reinforcement against flexing about the pivot line.

6. The mobile-dining mealholder of claim 1 wherein the tray portion has an outer edge and a vertically-extending edge portion formed therealong, thereby to provide reinforcement against flexing of the tray portion under loads imposed by food thereon.

7. The mobile-dining mealholder of claim 6 further including a removable tray cover having a cover edge portion configured for placement on the tray portion along the vertically-extending outer edge thereof, thereby to position the tray cover with respect to the tray portion.

8. The mobile-dining mealholder of claim 6 wherein the outer edge includes a near edge and a far edge and the cap portion is adjacent to the near edge, thereby enabling the user to hold the beverage and food nearby to facilitate drinking and eating.

9. The mobile-dining mealholder of claim 6 wherein the tray portion includes a plurality of food-receiving depressed regions formed therein, thereby providing further reinforcement against flexing of the tray portion under loads imposed by food thereon.

10. The mobile-dining mealholder of claim 9 wherein the tray portion, by virtue of the plurality of depressed regions, has vertically-extending portions positioned and arranged such that, for each of a plurality of imaginary horizontal pivot lines across the tray portion and adjacent to the cap portion, at least one of the vertically-extending portions is transverse to the pivot line, thereby providing reinforcement against flexing about the pivot line.

11. The mobile-dining mealholder of claim 1 wherein:

the bottle has a shoulder portion extending outwardly from the neck; and the tray portion of the plate-lid includes a shoulder-engagement portion which extends outwardly from the cap portion and is substantially complementary in shape to the shoulder portion, thereby to provide enhanced support for the tray portion.

12. The mobile-dining mealholder of claim 11 wherein the shoulder portion and the shoulder-engagement portion extend outwardly in a downward direction.

13. The mobile-dining mealholder of claim 1 wherein the first and second engagement means are configured and arranged such that engagement of the cap portion of the plate-lid with the neck of the bottle is a snap-on and screw-off engagement, thereby facilitating engagement of the bottle with the plate-lid in a fast-food service environment.

14. The mobile-dining mealholder of claim 1 wherein the second engagement means is configured and arranged such that engagement of the cap portion of the plate-lid with the neck of the bottle is a push-on engagement, thereby facilitating engagement of the bottle with the plate-lid in a fast-food service environment.

15. The mobile-dining mealholder of claim 14 wherein the second engagement means is an array of flexible, resilient projections configured and arranged to pass over and engage substantially rigid threading on the neck of the bottle, thereby facilitating push-on engagement of the plate-lid with the bottle in a fast-food service environment.

16. The mobile-dining mealholder of claim 1 wherein the first and second engagement means are configured and arranged such that engagement of the cap portion of the plate-lid with the neck of the bottle is a quarter-turn engagement, thereby facilitating engagement of the bottle with the plate-lid in a fast-food service environment.

17. In a mobile-dining mealholder having a beverage container and a plate-lid detachably combined, the improvement wherein:

the beverage container is a bottle having a main portion, a substantially narrower cylindrical neck which terminates upwardly in a lip and a shoulder portion extending outwardly from the neck, the neck having first engagement means projecting therefrom at axially-spaced positions;

the plate-lid includes (a) a substantially horizontal cap portion overlying the lip and terminating in a downward substantially cylindrical skirt which is detachably engaged with the neck, the skirt having second engagement means projecting therefrom at axially-spaced positions, and (b) a tray portion including a shoulder-engagement portion which extends outwardly from the cap portion and is substantially complementary in shape to the shoulder portion to provide enhanced support for the tray portion, the tray portion having horizontally-arranged foodholding areas spaced about the cap portion.

18. The mobile-dining mealholder of claim 17 wherein the skirt has a lower edge and the tray portion extends outwardly from the lower edge.

19. The mobile-dining mealholder of claim 17 wherein the second engagement means is configured and arranged such that engagement of the cap portion of the plate-lid with the neck of the bottle is a push-on engagement, thereby facilitating engagement of the bottle with the plate-lid in a fast-food service environment.

20. In a mealholder plate-lid for detachable combination with a beverage container to form a mobile-dining mealholder, the improvement wherein the beverage container is a bottle with a substantially cylindrical neck which terminates upwardly in a lip and has an outer surface with first engagement means projecting therefrom at axially-spaced positions, and wherein the plate-lid comprises:

a substantially horizontal cap portion for overlying the lip and having a downwardly-extending substantially cylindrical skirt which terminates in a lower edge, the skirt having an inner surface with second engagement means projecting therefrom at axially-spaced positions for engaging the first engagement means, and a tray portion extending outwardly from the cap portion and having a plurality of food-receiving depressed regions spaced about the cap portion, the tray and cap portions forming a single integral piece.

21. The mobile-dining mealholder of claim 20 wherein the cap portion of the plate-lid has a straw-receiving opening therethrough to gain access to the beverage.

22. The mobile-dining mealholder of claim 20 wherein the first and second engagement means are configured and arranged such that engagement of the cap portion of the plate-lid with the neck of the bottle is a snap-on and screw-off engagement, thereby facilitating engagement of the bottle with the plate-lid after food is served thereon.

23. The mobile-dining mealholder of claim 20 wherein the second engagement means is configured and arranged such that engagement of the cap portion of the plate-lid with the neck of the bottle is a push-on engagement, thereby facilitating engagement of the bottle with the plate-lid in a fast-food service environment.

24. The mobile-dining mealholder of claim 23 wherein the second engagement means is an array of flexible, resilient projections configured and arranged to pass over and engage substantially rigid threading on the neck of the bottle, thereby facilitating push-on engagement of the plate-lid with the bottle in a fast-food service environment.

25. The mobile-dining mealholder of claim 20 wherein the first and second engagement means are configured and arranged such that engagement of the cap portion of the plate-lid with the neck of the bottle is a quarter-turn engagement, thereby facilitating engagement of the bottle with the plate-lid after food is served thereon.

26. The mobile-dining mealholder of claim 20 wherein:

the bottle has a shoulder portion extending outwardly from the neck; and the tray portion of the plate-lid includes a shoulder-engagement portion which extends outwardly from the cap portion and is substantially complementary in shape to the shoulder portion, thereby to provide enhanced support for the tray portion.

27. The mobile-dining mealholder of claim 20 wherein the tray portion, by virtue of the plurality of depressed regions, has vertically-extending portions positioned and arranged such that, for each of a plurality of imaginary horizontal pivot lines across the tray portion and adjacent to the cap portion, at least one of the vertically-extending portions is transverse to the pivot line, thereby providing reinforcement against flexing about such pivot line.

* * * * *